Figure 3:
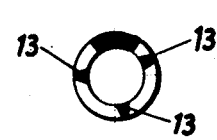

May 1, 1962   HANS-PETER ROTTMANN   3,032,737
CONNECTING PLUG
Filed Aug. 31, 1959

Inventor:
Hans-Peter Rottmann
By Munson H. Lane
Atty.

United States Patent Office 3,032,737
Patented May 1, 1962

3,032,737
CONNECTING PLUG
Hans-Peter Rottmann, Esslingen-Zollberg, Germany, assignor to Richard Hirschmann Radiotechnisches Werk, Esslingen (Neckar), Germany
Filed Aug. 31, 1959, Ser. No. 837,024
Claims priority, application Germany Sept. 6, 1958
4 Claims. (Cl. 339—101)

The invention relates to an electric connecting plug containing one or more contact members fixed in an insulator body in which the contact plate is carried by a metal casing, over which an outer insulating casing is slid. Connecting plugs of this type are often fitted with a protecting sleeve capable of preventing the sharp flexing of the cord at the connection of the latter with the plug structure. It is known to form the outer casing together with the socket or sleeve in one piece and in a single molding operation from a thermoplastic resin.

It is an object of the invention to provide a simple, practical and economical construction of such connecting plugs. For this purpose a spring finger is punched out of the metal casing which enters with its point having an angle bend into a recess in the outer insulating casing in a manner to prevent separation of the outer casing from the metal casings.

The outer insulating casing of the connecting plug, according to the present invention, is preferably made of a relatively hard material in order to assure a firm hold for the point of the spring finger as it is received in the recess. On the other hand, the protecting sleeve formed by a molding operation as hereinbefore noted, should be soft and flexible so that, when the cord is pulled sideways, it will flex together with the latter at a wide angle.

It is a further object of the invention, therefore, to provide an insulating casing wherein the contradictory requirements are fulfilled by its association with a protecting sleeve in accordance with an injection molding procedure. In this connection, it has been found desirable to increase the flexibility of the protecting sleeve, by the provision of suitably dimensioned circumferential recesses. These recesses are separated by narrow cross-pieces and occupy the entire circumference of the protecting sleeve. A larger number of rows of recesses is distributed over the length of the sleeve. The cross-pieces between the recesses in the protecting sleeve are arranged in staggered relationship to each other in successive rows of the recesses.

It has been found that advantages are realized by making the recesses in the sleeve in the form of slits extending perpendicularly or substantially perpendicularly to the axis of the plug and which, separated by small cross-pieces, occupy the entire circumference of the sleeve. In this manner, it is possible to distribute a larger number of rows of such slits over the whole length of the sleeve. The cross-pieces between successive rows of slits are preferably arranged in a mutually staggered fashion. The bending of the sleeve, in this case, has the effect of widening the slits to a rhombic form. This, of course, permits easy flexing of the sleeve even if it is made of a relatively hard plastic material.

It is, furthermore, desirable to have the resistance against flexing, in this type of sleeve, diminish gradually from the part which lies close to plug body toward its free end. This will provide a gradual transition in flexing capacity from the relatively non-resilient plug portion to the flexible cable. This can be accomplished by making the cross-pieces between the slits narrower toward the free end of the sleeve, or by providing less cross-pieces between the slits at the free end of the sleeve than at the end which is integral with the plug body.

The invention will be more readily understood by reference to the accompanying drawings and the following detailed description, which are included as illustrative only rather than as limiting the invention to the specific details herein set forth.

Figure 1:
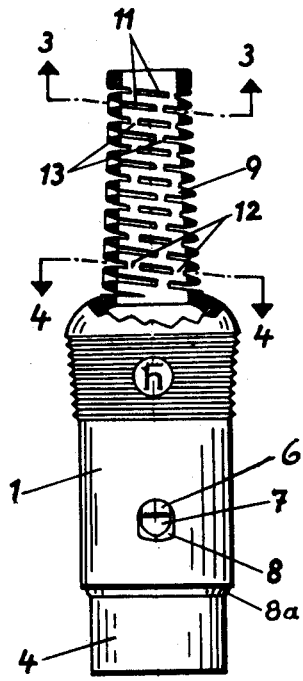
Figure 2:
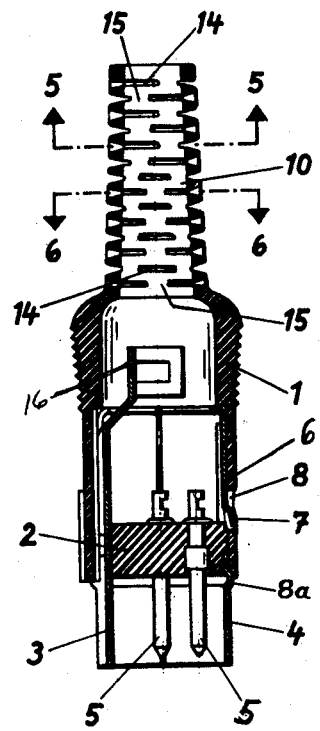
Figure 4:
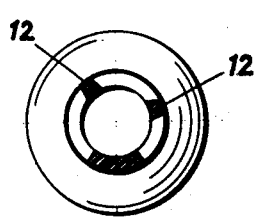

Referring to the drawing in which the preferred embodiments of the invention are illustrated:

FIG. 1 shows a first embodiment of the connecting plug with the protective socket partly in section;
FIG. 2 shows a sectional view of a second embodiment;
FIGS. 3 and 4 are cross-sectional views of the protecting sleeve in FIG. 1; and
FIGS. 5 and 6 are cross-sectional views of the protecting sleeve in FIG. 2.

An outer insulating casing 1 embraces two metal half-shells 3 and 4 between which is held a contact support plate 2 with its contact members 5. A spring member 6 punched out of the metal half-shell 4 engages with its point 7 that is bent at an angle, in a recess 8 of the outer casing 1 and prevents separation of the outer casing from the inner metal casing constituted by the half-shells 3 and 4. The outer casing holds the half-shells of the inner casing assembled and the half-shells 3 and 4 are provided with an outward bulge 8a to prevent downward movement of the outer casing 1. The half-shell 3 is preferably provided with an additional anchoring member 16 in which the cable is clamped so as to prevent any undesirable stresses being placed upon the circuit wires.

According to the embodiment shown in FIGS. 1, 3 and 4 a protecting sleeve 9 for the cable is molded onto the outer insulating casing 1 made of a thermoplastic resin. In order to make the protecting sleeve 9 sufficiently flexible it is provided in accordance with the present invention with a plurality of slits 11 which extend substantially perpendicularly to the axis of the outer casing 1 in a slightly ascending spiral line. The slits are separated from each other by relatively narrow cross-pieces 12 and 13. Three of such cross-pieces in each row are distributed circumferentially of the sleeve and are staggered with respect to those of adjacent rows. As shown by the cross-sectional views in FIGS. 3 and 4, the cross-pieces 13 are narrower near the free end of sleeve 9 than the cross-pieces 12 close to the outer insulating casing 1. The width of the cross-pieces can gradually diminish from row to row, or in less stages, for examples in only two stages.

Figure 5:
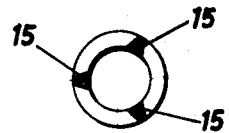
Figure 6:
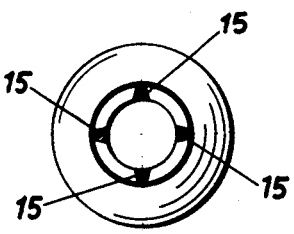

According to the embodiment in FIGS. 2, 5 and 6, the protecting sleeve 10 is provided with slits 14 in a larger number of rows running in circles perpendicular to the axis of the outer insulating casing 1. The cross-pieces 15 between the slits, which are also staggered with respect to those of adjacent rows, all have the same width. However, the part of the sleeve that lies close to the outer insulating casing 1 has four cross-pieces 15 distributed circumferentially thereof, whereas the sleeve part close to the free end has only three such cross-pieces 15 distributed circumferentially thereof, as shown by the cross-sectional views in FIGS. 5 and 6.

The contact support plate 2 of the connecting plug of the present invention may, of course, be replaced with suitably shaped insulating bodies including sleeve or socket members for making junctions between cable conductors.

The invention has been described in detail for the purpose of illustration, but it will be obvious that numerous modifications and variations may be resorted to without departing from the spirit of the invention as set forth in the following claims:

I claim:
1. An electric connecting plug comprising an insulating plate having one or more contact members associated therewith, a metal casing carrying the contact plate, an outer insulating casing slid over said metal casing, said outer casing together with a protecting sleeve for the cable being molded in one piece from a thermoplastic resin, and a spring finger punched out of said metal casing extending with its point that is bent at an angle into a recess in the outer casing to prevent separation of the outer casing from the metal casing, recesses in the protecting sleeve, separated by narrow cross-pieces, occupying the entire circumference of said sleeve, a larger number of rows of recesses being distributed over the length of said sleeve, said cross-pieces between said recesses in said protecting sleeve being arranged in staggered relationship to each other in successive rows of said recesses.

2. An electric connecting plug comprising an insulating plate having one or more contact members associated therewith, a metal casing carrying the contact plate, an outer insulating casing slid over said metal casing, said outer casing together with a protecting sleeve for the cable being molded in one piece from a thermoplastic resin, and a spring finger punched out of said metal casing extending with its point that is bent at an angle into a recess in the outer casing to prevent separation of the outer casing from the metal casing, recesses in the protecting sleeve being formed as slits that extend perpendicularly or substantially perpendicularly to the longitudinal axis of said sleeve and which, separated by narrow cross-pieces, occupy the entire circumference of said sleeve, a larger number of rows of slits being distributed over the length of said sleeve, said cross-pieces between said slits in said protecting sleeve being arranged in staggered relationship to each other in successive rows of said slits.

3. An electric connecting plug comprising an insulating plate having one or more contact members associated therewith, a metal casing carrying the contact plate, an outer insulating casing slid over said metal casing, said outer casing together with a protecting sleeve for the cable being molded in one piece from a thermoplastic resin, and a spring finger punched out of said metal casing with its point that is bent at an angle into a recess in the outer casing to prevent separation of the outer casing from the metal casing, recesses in the protecting sleeve being formed as slits that extend perpendicularly or substantially perpendicularly to the longitudinal axis of said sleeve and which, separated by narrow cross-pieces, occupy the entire circumference of said sleeve, a larger number of rows of slits being distributed over the length of said sleeve, said cross-pieces between said slits in said protecting sleeve being arranged in staggered relationship to each other in successive rows of said slits, and said cross-pieces between said slits becoming narrower toward the free end of said sleeve.

4. An electric connecting plug comprising an insulating plate having one or more contact members associated therewith, a metal casing carrying the contact plate, an outer insulating casing slid over said metal casing, said outer casing together with a protecting sleeve for the cable being molded in one piece from a thermoplastic resin, and a spring finger punched out of said metal casing with its point that is bent at an angle into a recess in the outer plastic casing to prevent separation of the outer casing from the metal casing, recesses in the protecting sleeve being formed as slits that extend perpendicularly or substantially perpendicularly to the longitudinal axis of said sleeve and which, separated by narrow cross-pieces, occupy the entire circumference of said sleeve, a larger number of rows of slits being distributed over the length of said sleeve, said cross-pieces between said slits in said protecting sleeve being arranged in staggered relationship to each other in successive rows of said slits, and wherein in the region of said sleeve toward its free end there are provided less cross-pieces between said slits than at the end which lies close to the plug.

References Cited in the file of this patent

UNITED STATES PATENTS

| | | |
|---|---|---|
| 1,964,350 | Greene | Junt 26, 1934 |
| 2,032,470 | Chirelstein | Mar. 3, 1936 |
| 2,060,761 | Landers | Nov. 10, 1936 |
| 2,191,386 | Herman | Feb. 20, 1940 |
| 2,201,578 | Grohsgal | May 21, 1940 |
| 2,276,818 | Bellows | Mar. 17, 1942 |
| 2,469,397 | Mezek | May 10, 1949 |
| 2,553,681 | Schmier | May 22, 1951 |
| 2,563,762 | Uline et al. | Aug. 7, 1951 |
| 2,727,088 | La Wall | Dec. 13, 1955 |
| 2,913,633 | Iannelli | Nov. 17, 1959 |

FOREIGN PATENTS

| | | |
|---|---|---|
| 213,533 | Australia | Feb. 26, 1958 |
| 1,164,361 | France | May 12, 1958 |